United States Patent [19]

Whited

[11] Patent Number: 4,645,997

[45] Date of Patent: Feb. 24, 1987

[54] TRANSIENT FREE SOLID STATE AUTOMATIC POWER FACTOR CORRECTION

[75] Inventor: James S. Whited, Radford, Va.

[73] Assignee: Kollmorgen Technologies Corporation, Dallas, Tex.

[21] Appl. No.: 711,170

[22] Filed: Mar. 13, 1985

[51] Int. Cl.[4] .............................. G05F 1/70; H02J 3/18
[52] U.S. Cl. .................................... 323/211; 323/235; 323/910
[58] Field of Search ................................ 323/209–211, 323/235, 319, 902, 910; 340/657, 658, 660, 664

[56] References Cited

U.S. PATENT DOCUMENTS

| | | | |
|---|---|---|---|
| 4,055,795 | 10/1977 | Mathieu | 323/211 |
| 4,348,631 | 9/1982 | Gyugyi et al. | 323/211 |
| 4,356,440 | 10/1982 | Curtiss et al. | 323/211 X |
| 4,365,190 | 12/1982 | Pasternack et al. | 323/211 |

FOREIGN PATENT DOCUMENTS 0047620  3/1984  Japan ................................. 323/211

OTHER PUBLICATIONS

"A System for the Automatic Correction of Electrical Power Factor", Lunsford Systems, Inc., brochure.

*Primary Examiner*—Peter S. Wong
*Attorney, Agent, or Firm*—Morgan & Finnegan

[57] ABSTRACT

In an apparatus for controlling the power factor of a power distribution system connected to inductive loads, banks of delta connected capacitors are added to or removed from the power lines of the power distribution system by a plurality of solid state switching devices which are under the control of a microprocessor. The solid state switching devices include optically isolated SCR devices that do not generate electrical interference and provide transient free operation. The microprocessor is also capable of calculating the power factor and displaying it on a digital readout.

16 Claims, 7 Drawing Figures

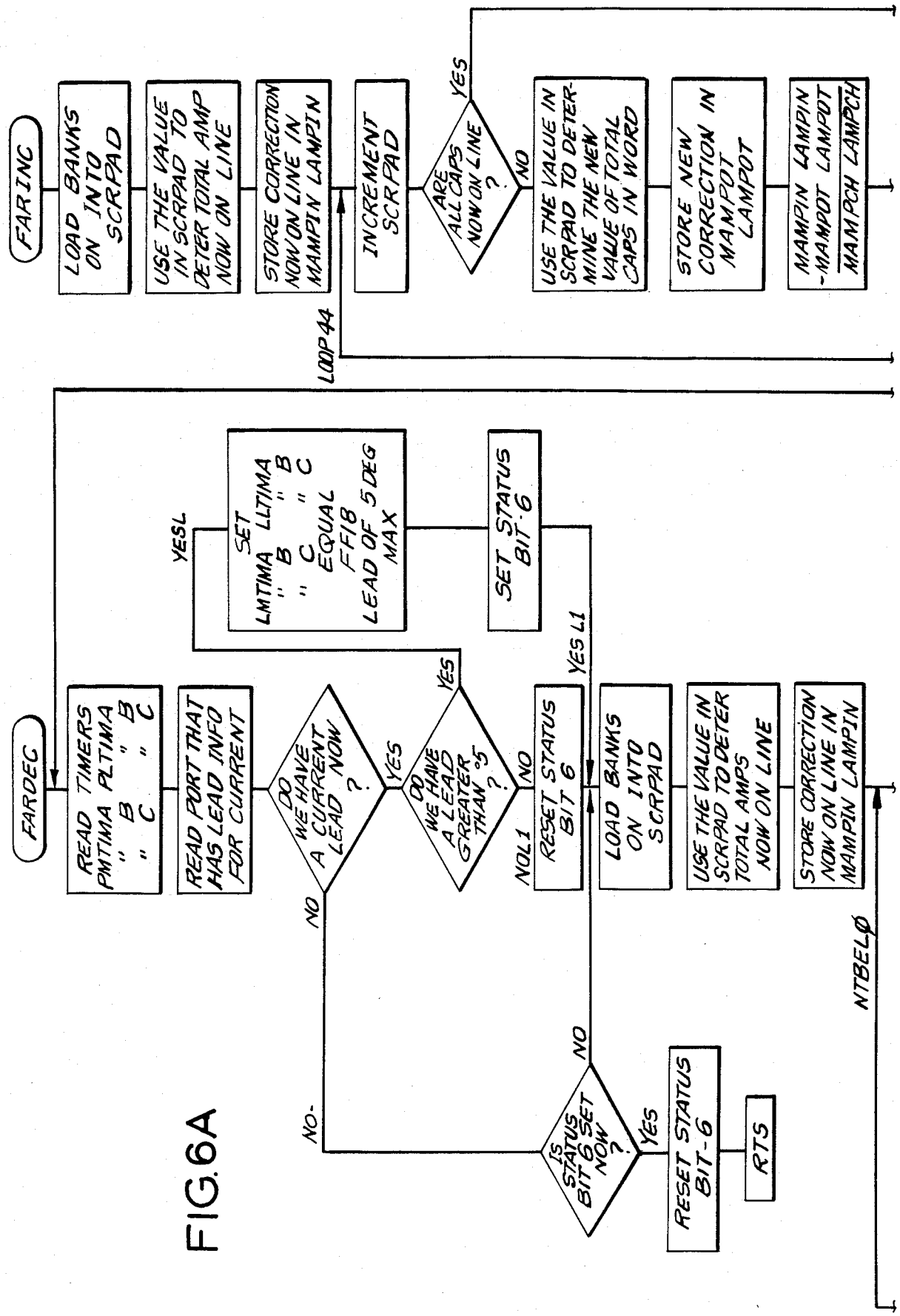

TRANSIENT FREE SOLID STATE AUTOMATIC POWER FACTOR CORRECTION

BACKGROUND OF THE INVENTION

1. Field of the Invention

The present invention relates generally to alternating current power distribution systems and more specifically to an automatic power factor control device for such systems.

2. Description of the Prior Art

When inductive loads are added or subtracted to a power distribution system, they can have an adverse effect on the power factor which results in excess consumption of electrical energy. Due to the relatively high costs of electrical energy, this excess consumption can substantially increase the cost of operating inductive equipment such as electrical motors or inductive heaters.

It is well known to those skilled in the art that banks of capacitors can be added or subtracted to the power distribution system in order to improve the power factor. These prior art devices typically include mechanical contactors for switching the capacitor banks into or out of the system. These mechanical contactors cause undesirable electrical interference and electrical transients.

One attempt to solve the problems associated with power factor control is described in U.S. Pat. No. 4,356,440 by Curtis et al., assigned to the Charles Stark Draper Laboratory, Inc. and entitled, "Power Factor Correction System". The '440 patent discloses a discrete-time, closed loop power factor corrector system that controls the coupling of a delta-connected switched capacitor array to a 3- or 4-wire power line which may have time-varying, unbalanced, inductive loads. For inductive loads that cannot be exactly compensated with a delta-connected capacitance, the corrector system minimizes the total RMS reactive current drawn from the power line.

Another attempt to solve the power factor problem is disclosed in U.S. Pat. No. 4,348,631, Gyugyi et al., assigned to Westinghouse Electric Corp., and entitled, "Static VAR Generator". The '631 patent discloses a device for inserting capacitance into an AC network for power factor correction or voltage regulation that minimizes transient disturbances to the system. Current surges and voltage transients that are normally associated with connection of capacitors into an AC network are minimized by predetermining an amount of inductance that must be inserted to suppress these transients and simultaneously inserting the inductance into the network with the capacitance.

SUMMARY OF THE INVENTION

The apparatus of the present invention provides an automatic power factor control device for an alternating current power distribution system having inductive loads coupled thereto. The automatic power factor control device is connected to each line of the multi-phase power distribution system and generates signals indicative of the voltage and current associated with each line. The current and voltage signals of each phase are compared to one another to determine the phase lag therebetween and to generate signals indicative of a time associated with the phase lag. The time dependent signals are applied to a microprocessor controlled circuit that converts the time dependent signals into a degree value and determines the cosine of the degree value. The cosine is then multiplied by 100 to provide a power factor which can be displayed on a digital readout. The microprocessor controlled circuit also controls a switching network that is capable of adding or removing banks of delta connected capacitors to or from the power lines. As the power factor decreases, the banks of the delta connected capacitors are connected to the power lines to improve the power factor. The switching network includes only two SCR switches per bank of capacitors. The banks of capacitors can be connected at any time regardless of the voltage potential residing on the capacitors without creating any current surges or electrical transients.

DETAILED DESCRIPTION OF THE INVENTION

Figure 1:
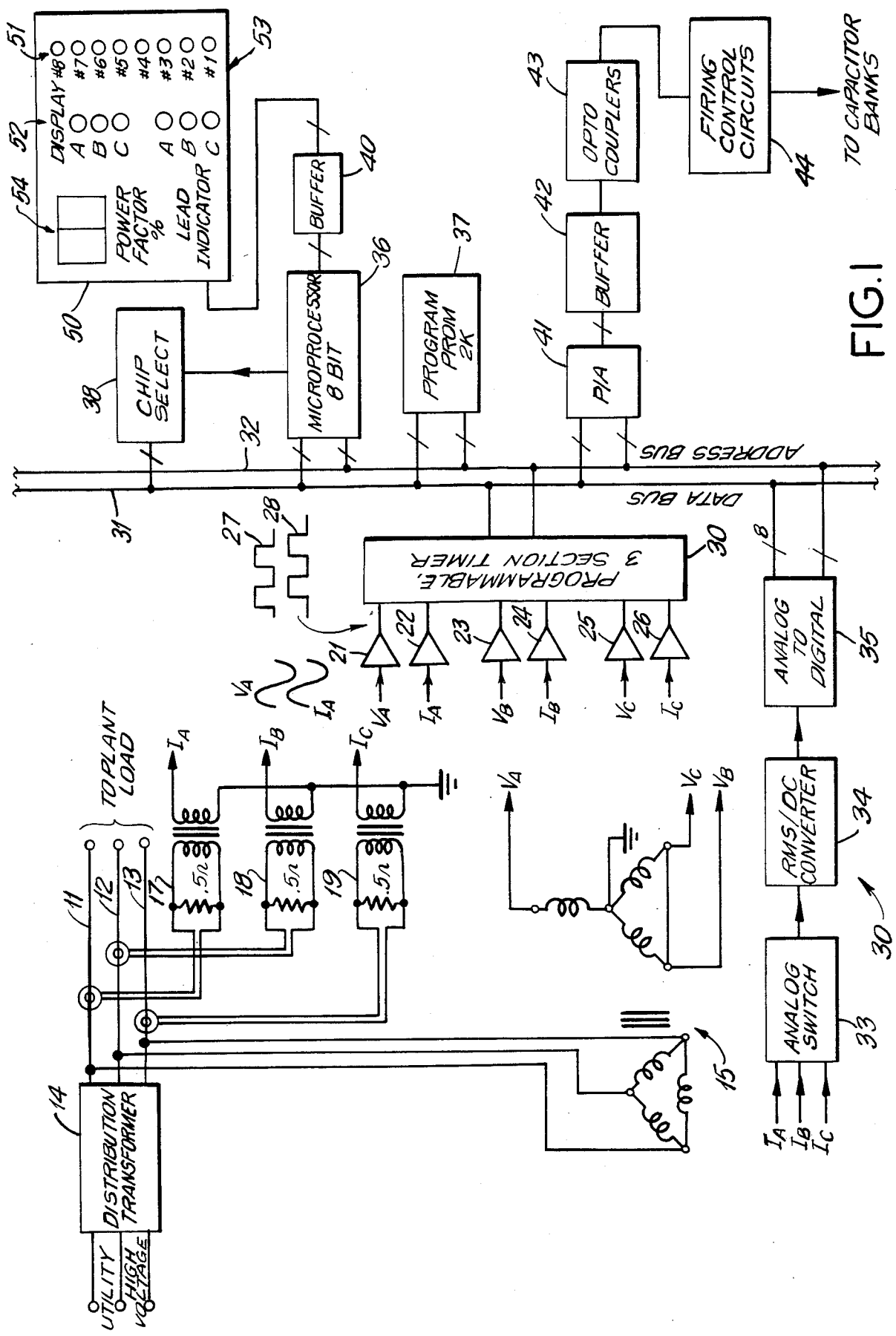
FIG. 1 is a block description of the automatic power factor control device of the present invention.

Referring now to FIG. 1, a block diagram illustrates the automatic power factor control device of the present invention. The automatic power factor control device is connected to a power distribution system which includes the high voltage power lines 11, 12, 13 which are connected to a distribution transformer 14. The distribution transformer 14 distributes the high voltage electrical energy to a plant which places a load on the power distribution system. When the plant load includes a number of inductive devices such as electrical motors or inductive heaters, the power factor of the electrical energy is adversely affected. This change in power factor can increase the consumption of electricity and increase the cost of operating the plant.

The automatic power factor control device includes a potential transformer 15 having three small single phase transformers that provide three output signals, $V_A$, $V_B$, $V_C$, which are indicative of the voltage associated with the power lines 11, 12, 13. A plurality of transformers 17, 18, 19 are also connected to the power lines 11, 12, 13 and provide output signals $I_A$, $I_B$, $I_C$ which are indicative of the current associated with the power lines.

The output signals $V_A$, $V_B$, $V_C$ are applied to comparators 21-26. In FIG. 1 the sinusoidal waveforms $V_A$ and $I_A$ are illustrated as being representative waveforms applied to comparators 21-26. It can be appreciated that there is a phase lag between the waveforms $V_A$ and $I_A$ of FIG. 1. When these two waveforms are applied to comparators 21, 22, they generate two rectangular signals 27, 28. Likewise, comparators 23-26 also generate signals which for the sake of simplicity are not illustrated. The output of comparators 21-26 is applied to a programmable three section timer 30. The output signals of the timer 30 are applied as input to a data bus 31 and an address bus 32. The output signals of the timer 30 are time dependent signals indicative of the phase lag between the voltage and current of the power lines 11, 12, 13.

The address bus 31 and the data bus 32 are also connected to an analog section 30 which is comprised of an analog switch 33, a RMS/DC converter 34, and an analog-to-digital converter 35. The inputs to the analog switch 33 are the waveforms $I_A$, $I_B$, $I_C$. If the waveforms $I_A$, $I_B$, $I_C$ fall below a set level, the analog section 30 provides the automatic power factor control device with a signal that causes it to remove any correction and to generate an error code.

The data bus 31 and address bus 32 are connected to an eight bit microprocessor 36 which is preferably a Motorola 6802 microprocessor. The microprocessor is responsive to a program stored in a programmable read only memory (PROM) 37. The microprocessor 36 is also connected to a chip select 38 and a buffer 40 which couples the microprocessor to a display panel 50.

The output of the microprocessor 36 is applied to a peripheral interface adapter (PIA) 41 which is used to control banks of wye connected capacitors, which are hereinafter described in greater detail. The PIA 41 is connected to a buffer 42, a plurality of optocouplers 43, and a plurality of firing control circuits 44 in order to add or remove the banks of delta connected capacitors to or from the power lines 11, 12, 13. In the preferred embodiment of the present invention there are eight optocouplers 43, sixteen firing control circuits 44, and eight banks of delta connected capacitors.

The display panel 50 includes a plurality of light emitting diodes (L.E.D.'s) 51 labeled #1–#8 that indicate which of the eight banks of delta connected capacitors are presently coupled to the power lines 11, 12, 13. The display panel also includes display L.E.D's 52 labeled A, B, C and lead indicating L.E.D.'s 53 labeled A, B, C which provide information regarding the status of phases A, B, C, associated with the power lines 11, 12, 13. The display panel 50 further includes a digital readout 54 which provides a percentage value for the power factor.

Figure 2:
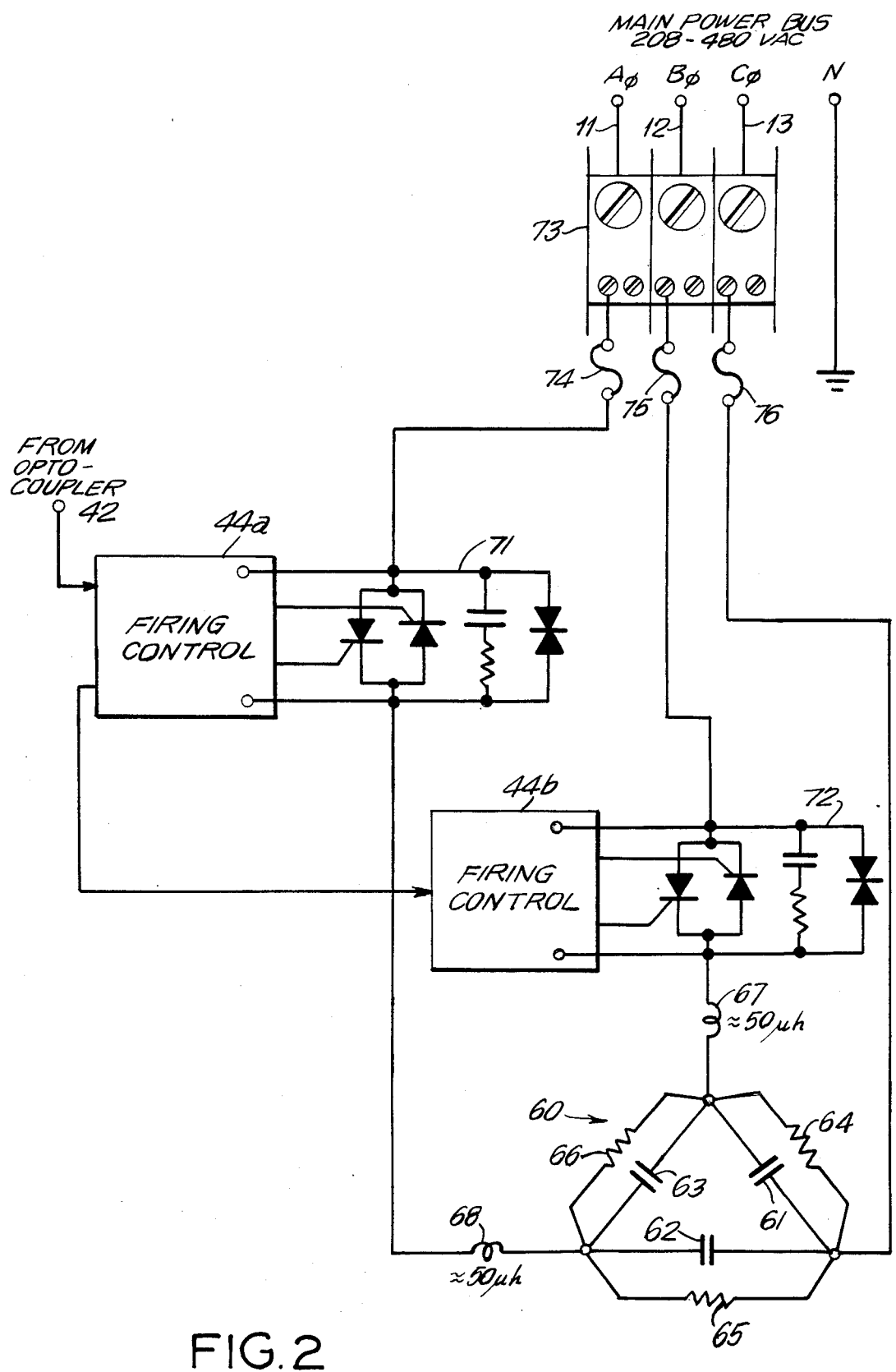
FIG. 2 is a block diagram of the firing control circuits, power lines and a delta connected capacitor bank of the present invention.

Referring now to FIG. 2, a block diagram illustrates a single bank 60 of the delta connected capacitors. The bank 60 is comprised of three delta connected capacitors 61, 62, 63 which have bleeder resistors 64, 65, 66 that are connected in parallel thereto. In the preferred embodiment of the present invention there are eight banks 60 of delta connected capacitors. Capacitors 61, 62, 63, are connected to SCR switches 71, 72 by inductors 67, 68. Preferably, the SCR switches include two oppositely poled SCR devices. The SCR switches 71, 72 are controlled by firing control circuit 44a, 44b, respectively. There is a firing control circuits 44a and firing control circuit 44b, for each bank 60 of delta connected capacitors. The bank 60 of delta connected capacitors is coupled to the three phase power lines 11, 12, 13 at a terminal block 73. Preferably, there are fuses 74, 75, 76 disposed between the automatic power factor control device and the terminal block 73.

Figure 3:
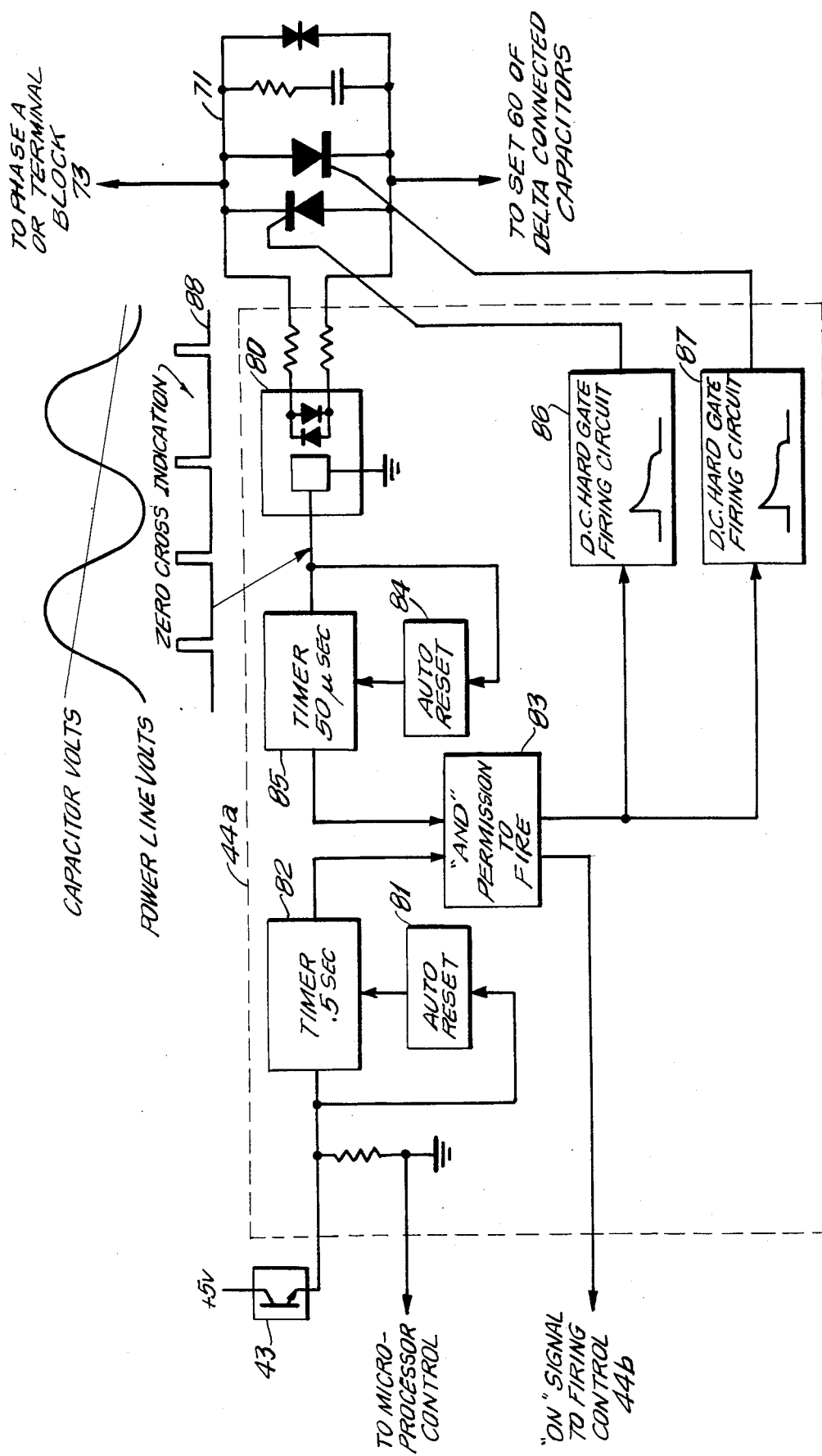
FIG. 3 is a schematic block diagram of the firing control circuit of FIG. 2.
Figure 4A:
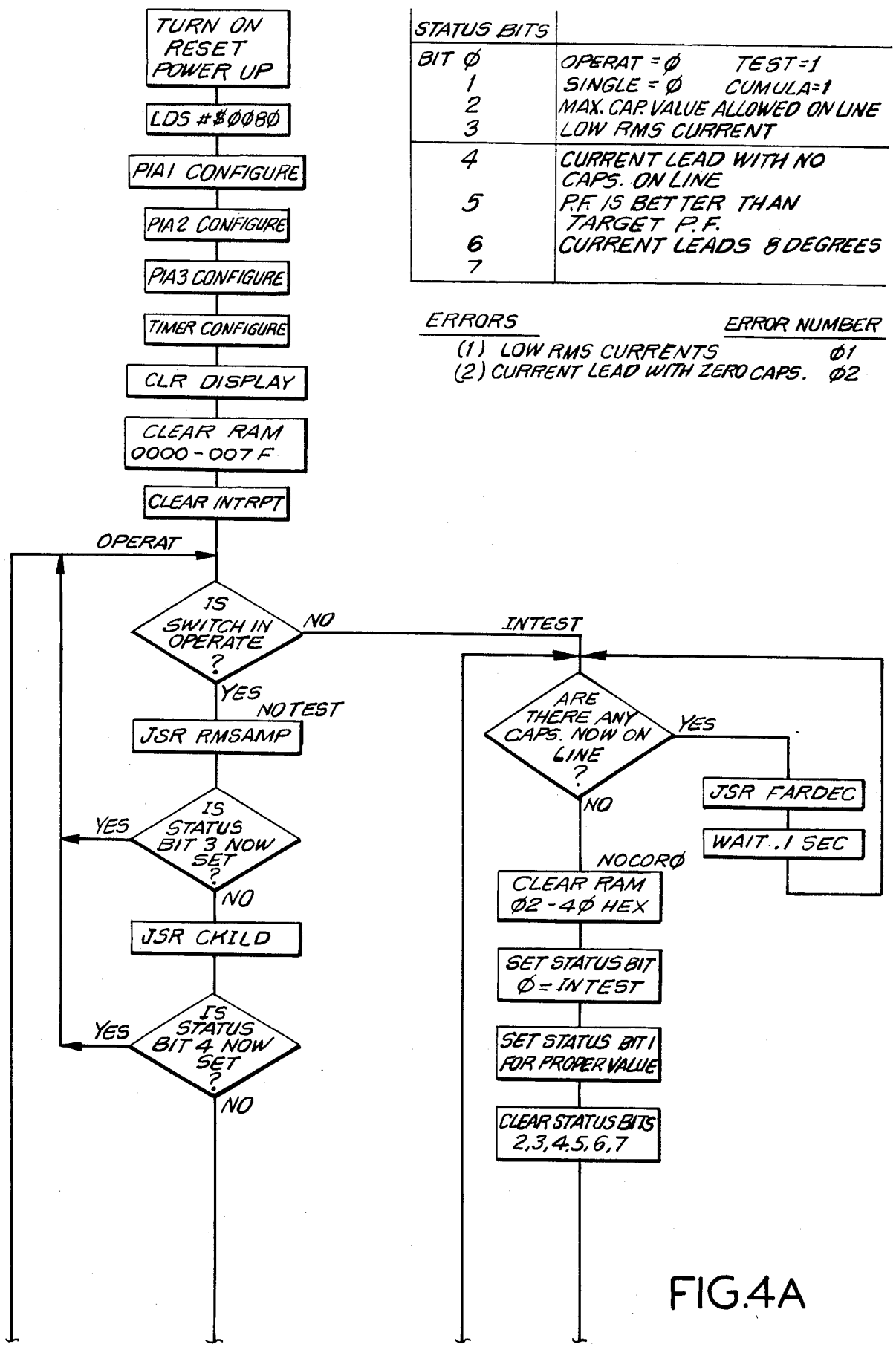
FIGS. 4-7 are flow charts of the software associated with the present invention.
Figure 4B:
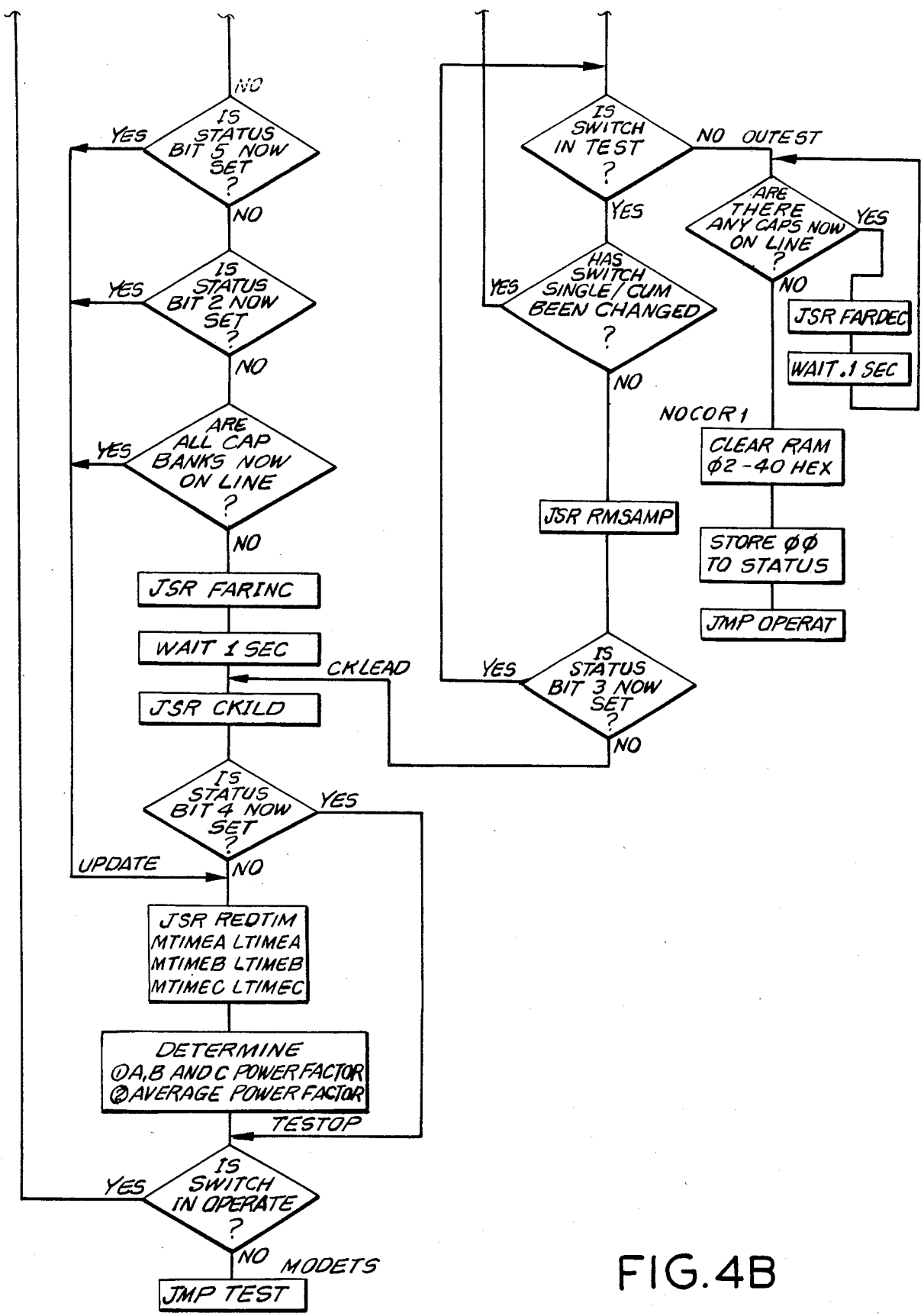
Figure 5A:
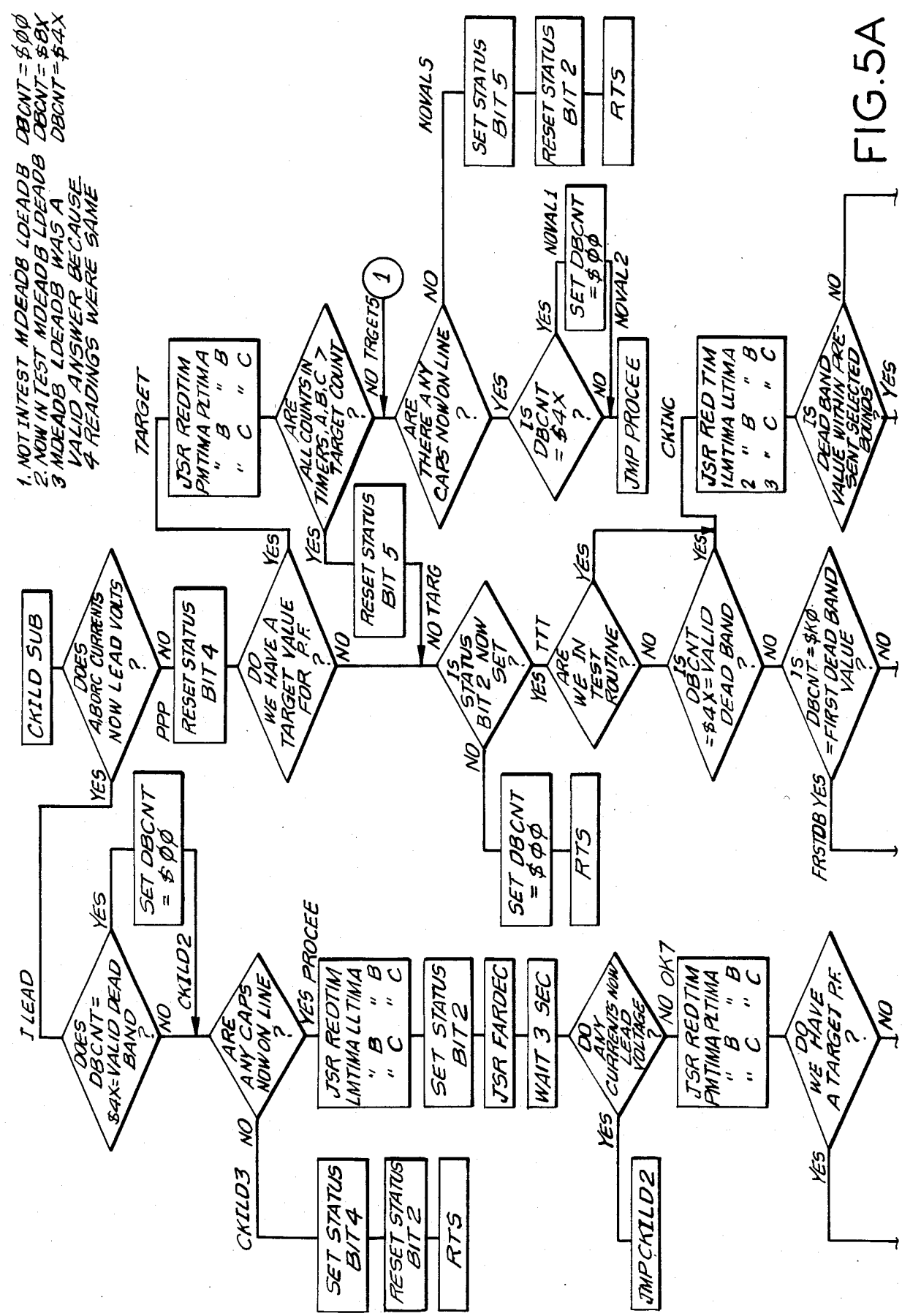
Figure 5B:
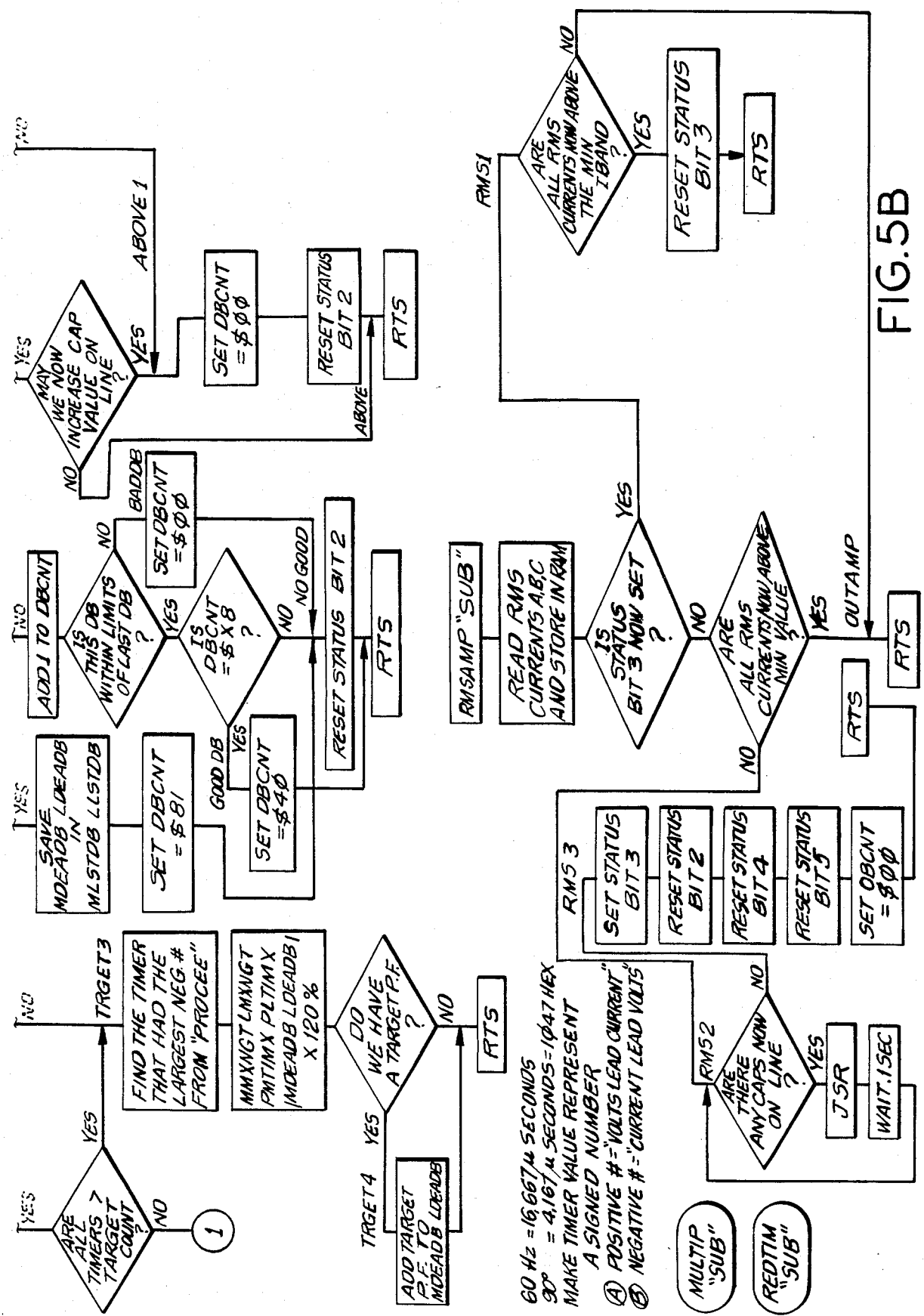
Figure 6B:
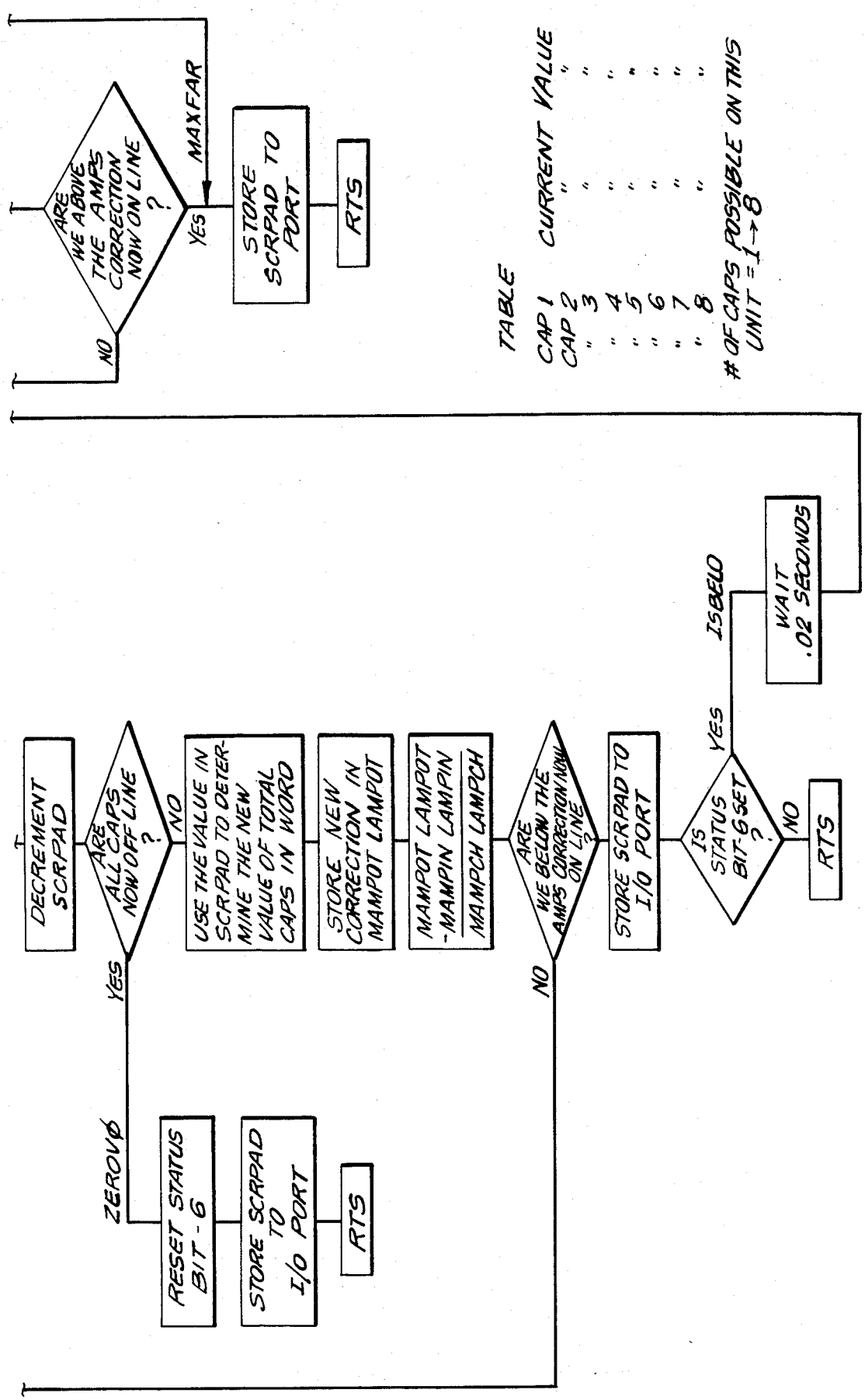
Figure 7:
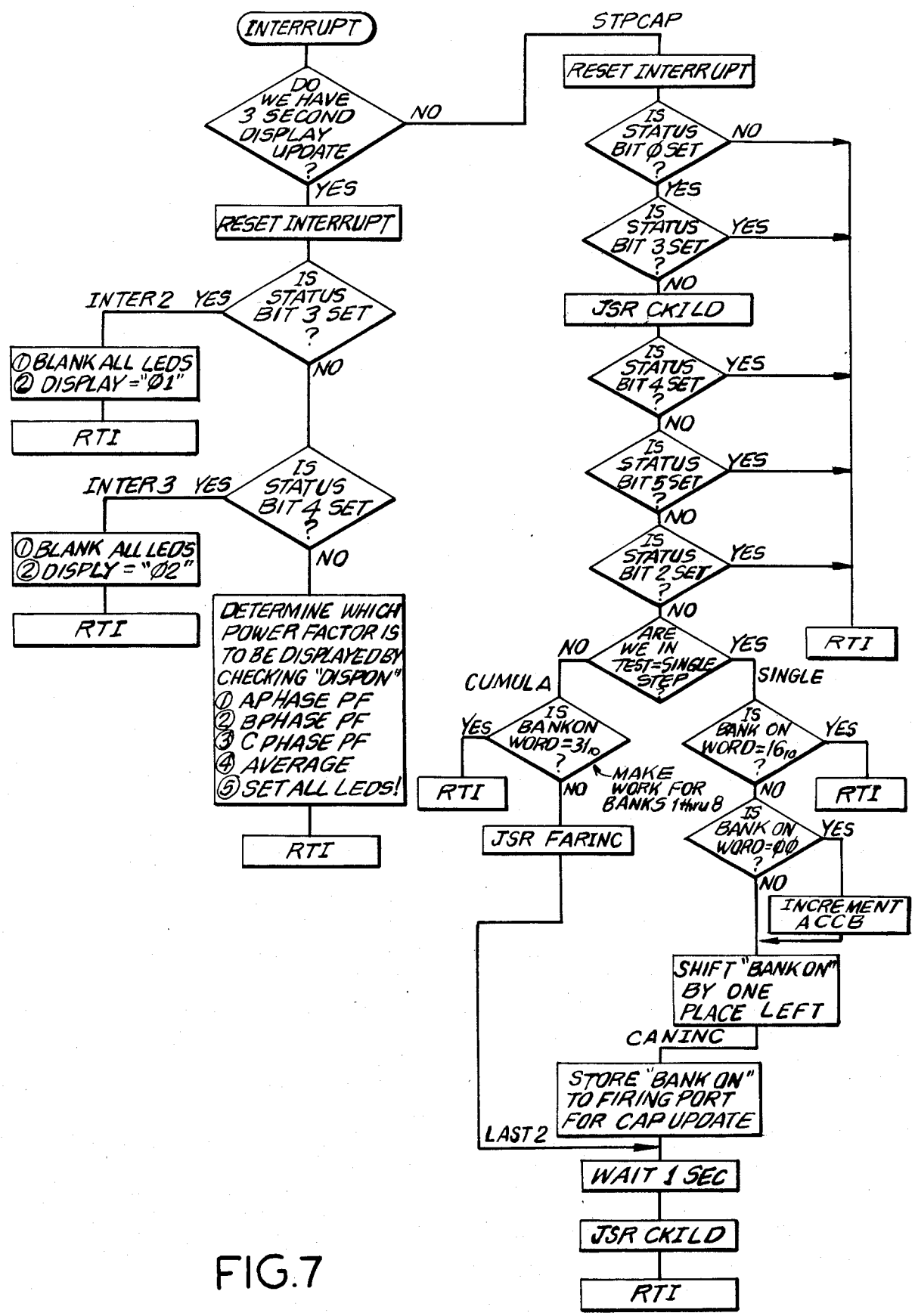

Referring now to FIG. 3, a schematic block diagram illustrates the details of the firing control circuit 44a. The firing control circuit 44b is substantially identical to firing control 44a except that it is connected within the automatic power factor control device in a different fashion as illustrated in FIG. 2. For purposes of simplicity only firing control 44a will be described.

The firing control 44a is connected to the optocoupler 43, the SCR switch 71, and the firing control 44b. A first input to the firing control 44a from the buffer 42 is provided by the optocoupler 43. A second input to firing control 44a is provided by the optocoupler 80 which is connected to the SCR switch 71. The input from the optocoupler 43 is applied to an auto-reset circuit 81 and a 0.5 second timer 82 and then to an AND circuit 83. The input from the optocoupler 80 is applied to an auto-reset circuit 84 and a 50 microsecond timer 85 and then to the AND circuit 83. The output of the optocoupler 80 is a rectangular waveform 88 which is a zero cross indication between the voltage of the power lines 11, 12, or 13 and the voltage across the capacitors 61, 62, or 63.

It should be noted that it is not necessary to wait for the voltages of capacitors 61, 62, 63 to discharge. The firing control 44a can reapply the switch 71 at any point where the voltage across the switch is zero.

The purpose of the auto reset circuits 81, 84 is to insure that noise does not initiate a fire command to the SCR switch 71 which is applied through the d.c. hard gate firing circuits 86, 87. The signal to the microprocessor control and the zero cross signal must be on continuously until the timers 82, 85 "time out". Any noise situation will reset the timers 82, 85. It should also be pointed out that the "on" signal to firing control 44b is delayed 0.5 seconds so that the "on" command is staggered.

Referring now to FIGS. 4–7, flow charts illustrate the software stored in the PROM 37. The program in PROM 37 controls the hardware described above in FIGS. 1–3 and also allows the microprocessor 36 to calculate the power factor which is displayed in readout 54. The power factor is calculated by converting the phase lag between signals $V_A$, $V_B$, $V_C$ and $I_A$, $I_B$, $I_C$ to a time dependent signal. The time dependent signal is converted to degrees and the degrees are then converted to cosine values using a look up table which may be located in the PROM 37. The cosine values are then multiplied by one hundred to arrive at the power factor value, which is displayed in the readout 54.

Depending on the computed value the microprocessor 36 places on line at least one bank 60 of delta connected capacitors. The microprocessor 36 then recomputes the power factor and looks for a leading condition or a factor that is slightly greater than a "target" value, e.g. 96% (target=95%). If no "lead" is detected at that point, no more banks 60 of capacitors are added. The arrangement of banks 60 of capacitors is such that a smooth progression of capacitance values may be manipulated. Preferably, the values are arranged in a binary progression. Thus, if there are eight banks 60 of capacitors, 256 separate combinations can be connected to the power lines 11, 12, 13.

The flow charts of FIGS. 4–7 include a number of routines. In order to appreciate the functions of these routines, Table I below lists the names of these routines and describes their functions.

TABLE I

| Routine | Address | Description |
|---------|---------|-------------|
| DABBD | FC4D | Part of the CKILD routine. Handles the case of a power factor reading out of allowable dead band area. |
| CKILD | FB99 | Main routine for incrementing capacitor bank 60. Reads current power factor, checks for phase lead, checks for power factor within target values, sets status bits. |
| CKLEAD | F906 | Part of main OPERATE loop. Checks for power factor lead following a capacitor bank 60 in cumulative pattern. |

TABLE I-continued

| Routine | Address | Description |
|---|---|---|
| CUMULA | FB8B | Part of INTERR routine. If user has requested a STEP operation in CUMULATIVE mode, this routine increments capacitor bank 60 in cumulative pattern. |
| FARDEC | FE12 | Main routine for decrementing capacitor bank 60. It reads the power factor and checks for a leading condition. If power factor is leading, this routine determines which capacitor bank 60 to remove and then removes it. This procedure is repeated until power factor no longer leads. |
| FARINC | FDC2 | Main routine for incrementing capacitor bank 60. It determines which capacitor bank 60 to add and then adds it. Unlike FARDEC, it does not read current power factor, nor does it do more than one increment. |
| FRSTDB | FC43 | Part of CKILD routine. This routine handles the first occurrence of a power factor reading within the specified dead band area. |
| ILEAD | FC57 | Part of CKILD routine. If the power factor is leading, this routine removes capacitor banks 60 until there is no longer a lead. |
| INTERR | FAE7 | Main interrupt handler. Determines source of interrupt and, based on this, either updates display or increments capacitor bank 60. |
| INTEST | F93E | Main test loop. In this loop, user can increment capacitor bank 60 under manual control. |
| ISBELO | FE86 | Part of FARDEC routine. It handles case of power factor leading in excess of maximum allowable value. It waits 20 milliseconds and then repeats a capacitor bank 60 decrement, greatly speeding up normal decrement cycle. |
| MAXFAR | FDE4 | Part of FARINC routine. It outputs calculated capacitor bank 60 configuration to the port controlling the capacitor banks 60. |
| NOTARG | FBB3 | Part of CKILD routine. This section checks for power factor within specified deadband area. If within deadband, it sets a flag value to prevent further updates until power factor moves out of deadband. |
| NTBELO | FE5F | Part of FARDEC routine. This section calculated the new capacitor bank 60 configuration when a decrement is required. |
| OPERAT | F8CF | Main program loop. Checks for setting of switches 71, reads unit status, checks power factor, and calls routines to increment or decrement capacitor bank 60. |
| OUTEST | F988 | Exit code for INTEST. Clears capacitor banks 60, zeroes variables, and reinitializes unit in preparation for automatic mode. |
| RMS1 | FA94 | Part of RMSAMP routine. Gets the appropriate status bit if all three phase currents A, B, C are above the minimum level. |
| RMS2 | FAAD | Part of RMSAMP routine. Checks to see if any capacitors banks 60 are on-line if current is below minimum value. If there are some online, it turns them off, one at a time. |
| RMS3 | FABD | Part of RMSAMP routine. Gets various status bits based upon current system conditions. |
| RMSAMP | FA60 | Reads RMS current, checks to see if current is above minimum specified value. Sets status bits. |
| TARGET | FD5D | Part of CKILD routine. If a target power factor has been specified, this routine checks to see if last read power factor is within this range. |
| TESTOP | F936 | Part of main OPERATE routine. Test status of OPERATE/TEST switch. |
| UPDATE | F90F | Part of main OPERATE routine. Reads current power factor, formats result and updates displays. |
| ZEROVO | FEB7 | Part of FARDEC routine. Sets the appropriate status bits and capacitor configuration for case where all capacitor banks 60 are removed from power lines 11, 12, 13. |

For a greater appreciation of the operation of the software and hardware reference may be had to Appendix A. Appendix A is the assembly language program stored in PROM 37. The assembly language program includes source code as well as explanatory comments which would enable those skilled in the art to generate the software of PROM 37. However, the description in the specification is believed to be sufficient for those skilled in the art to understand the instant invention, therefore, Appendix A is to be retained in the file and not be printed.

While the invention has been described in its preferred embodiments, it is to be understood that the words which have been used are words of description, rather than limitation, and that changes may be made within the purview of the appended claims without departing from the true scope and spirit of the invention in its broader aspects.

I claim:

1. A transient free automatic power correction factor device for a multiphase alternating current source having a plurality of power lines which comprises:
   first means for detecting the current of each phase of the power lines of the alternating current source;
   second means for detecting the voltage of each phase of the power lines of the alternating current source;
   third means, responsive to said first means and said second means, for providing a count indicating the phase difference between current and voltage and for converting the count into a plurality of time dependent signals;
   microprocessor means, responsive to said third means, for executing instructions for converting the time dependent signals into degrees, for converting the degrees into a cosine value, to provide a power factor value signal;
   a plurality of banks of delta connected capacitors responsive to switching signals for adding or removing capacitance to or from the power lines of the alternating current source in response to the switching signals; and
   solid state switching means responsive to said power factor value signal for supplying said switching signals to said capacitors when, for any voltage, said voltage on said capacitors equals said voltage on the associated power line, whereby banks of capacitors can be added or subtracted at any time without creating any current surge or electrical transient.

2. An apparatus according to claim 1 which further includes a display for indicating information regarding the power factor value.

3. An apparatus according to claim 2 wherein said solid state switching means includes only two SCR devices for controlling a single bank of delta connected capacitors.

4. An apparatus according to claim 3 wherein said switching means is optically isolated.

5. An apparatus according to claim 4 wherein said first means includes a plurality of transformers connected to each of the power lines for providing the current indication.

6. An apparatus according to claim 5 wherein said second means includes a potential transformer having a plurality of single phase transformers.

7. An apparatus according to claim 6 wherein said third means includes a plurality of comparators and a programmable timer.

8. An apparatus according to claim 7 which further includes an analog circuit means for determining when the current indications fall below a predetermined level such that said delta connected capacitors can be removed.

9. An apparatus according to claim 1; wherein said solid state switching means includes switch means responsive to a zero cross indication signal and said power factor value signal for connecting said capacitors to said associated power line, and means for generating said zero cross indication signal when said voltage on said capacitors equals said voltage on said associated power line.

10. An apparatus according to claim 1; and further comprising memory means connected to said microprocessor means for storing instructions to cause said microprocessor means to calculate said power factor value.

11. An apparatus according to claim 10; wherein said memory means stores instructions to cause said microprocessor means to generate said switching signals after said microprocessor means has calculated said power factor value.

12. An apparatus according to claim 11; wherein said memory means stores instructions to cause said microprocessor means to recalculate said power factor value after said microprocessor means has generated said switching signals.

13. An apparatus according to claim 12; wherein said memory means stores a target value for said power factor value, and instructions for causing said microprocessor means to compare said recalculated power factor value with said target value, and said memory means further stores instructions for causing said microprocessor means to generate said switching signals in response to said comparison.

14. An apparatus according to claim 13; wherein said memory means stores instructions for causing said microprocessor to convert said time dependent signals into said degrees.

15. An apparatus according to claim 14; wherein said memory means stores a table for converting said degrees into said cosine values.

16. An apparatus according to claim 15; and further comprising interface means for connecting said microprocessor means to said solid state switching means.

* * * * *